(12) United States Patent
Purz et al.

(10) Patent No.: US 11,091,124 B2
(45) Date of Patent: *Aug. 17, 2021

(54) WIPER ARM DEVICE TO CLEAN A VEHICLE WINDSHIELD AND USE OF THE WIPER ARM DEVICE

(71) Applicant: Valeo Wischersysteme GmbH, Bietigheim-Bissingen (DE)

(72) Inventors: Matthias Purz, Bietigheim-Bissingen (FR); Wolfgang Scholl, Bietigheim-Bissingen (FR)

(73) Assignee: Valeo Wischersysteme GmbH, Bietigheim-Bissingen (DE)

(*) Notice: Subject to any disclaimer, the term of this patent is extended or adjusted under 35 U.S.C. 154(b) by 330 days.

This patent is subject to a terminal disclaimer.

(21) Appl. No.: 16/225,834

(22) Filed: Dec. 19, 2018

(65) Prior Publication Data

US 2019/0193686 A1    Jun. 27, 2019

(51) Int. Cl.
*B60S 1/34* (2006.01)
*B60S 1/38* (2006.01)

(52) U.S. Cl.
CPC ........... *B60S 1/3486* (2013.01); *B60S 1/3402* (2013.01); *B60S 1/345* (2013.01); *B60S 1/3409* (2013.01); *B60S 1/3431* (2013.01); *B60S 2001/3824* (2013.01)

(58) Field of Classification Search
CPC ........ B60S 1/3486; B60S 1/34; B60S 1/3402; B60S 1/3431; B60S 1/3409; B60S 2001/3824; B60S 1/345
USPC .......................... 15/250.351, 250.352, 250.37
See application file for complete search history.

(56) References Cited

U.S. PATENT DOCUMENTS 2,613,385 A * 10/1952 Wylie .................... B60S 1/524
15/250.351

FOREIGN PATENT DOCUMENTS

| DE | 3932857 | * | 4/1991 |
| DE | 102005015038 | * | 10/2006 |
| GB | 754788 | * | 8/1956 |
| GB | 853516 | * | 11/1960 |

OTHER PUBLICATIONS

Machine translation of description portion of German publication 102005015038, published Oct. 2006. (Year: 2006).*

* cited by examiner

*Primary Examiner* — Gary K. Graham
(74) *Attorney, Agent, or Firm* — Osha Bergman Watanabe & Burton LLP

(57) ABSTRACT

The invention relates to a wiper arm arrangement (100) for cleaning a vehicle window (1), with a wiper arm head (10) that can be at least indirectly connected by means of a wiper arm rod (22) with a wiper blade (5) at a first end region with a drive shaft (12) and a second end region lying opposite the first end region, wherein the wiper arm rod (22) is pivotably mounted on the side facing the wiper arm head (10) in a first pivoting axis (20). The invention provides that the wiper arm rod (22) consist of two elements (26, 28), a first element (26) connected with the wiper arm head (10) and a second element (28) that can be connected at least indirectly with the wiper blade (5), and that the two elements (26, 28) be arranged so that they can pivot relative to each other in a second pivoting axis (30), wherein the second pivoting axis (30) is arranged essentially perpendicular to the first pivoting axis.

7 Claims, 1 Drawing Sheet

WIPER ARM DEVICE TO CLEAN A VEHICLE WINDSHIELD AND USE OF THE WIPER ARM DEVICE

PRIOR ART

Figure 1:
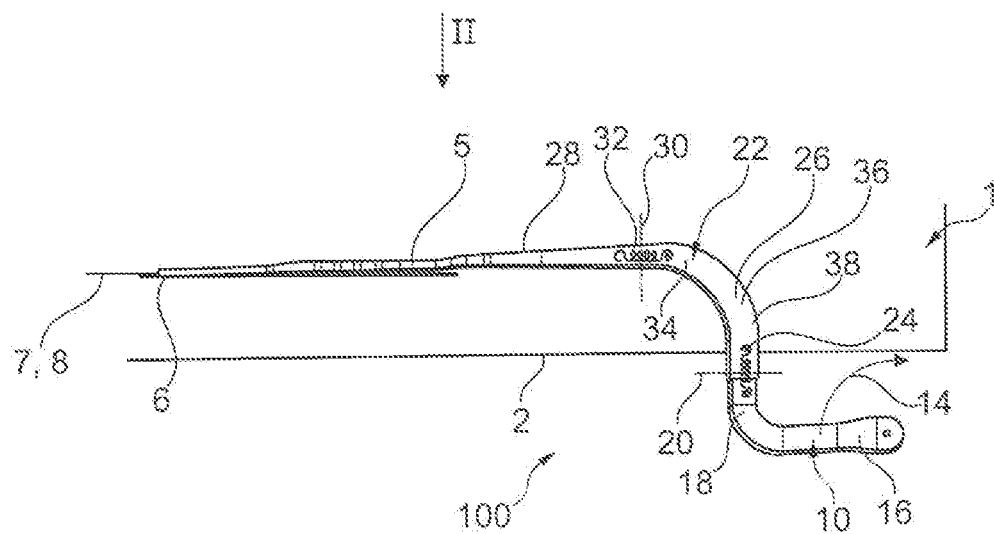

The invention relates to a wiper arm arrangement for cleaning a vehicle window according to the preamble of claim 1, as well as to the use of a wiper arm arrangement according to the invention.

A wiper arm arrangement for cleaning a vehicle window with the features in the preamble of claim 1 is already known from practice, and serves to clean a spherically curved vehicle window, in particular a vehicle window of a commercial vehicle. When the wiper blade sweeps along the vehicle window, achieving an optimal wiping result here requires that the wiper rubber of the wiper blade abut in a defined position relative to the vehicle window. This position is distinguished by as perpendicular an orientation of the wiper blade longitudinal plane as possible relative to the vehicle window. In order to retain this defined position as precisely as possible, the known wiper arm arrangement has a wiper arm head that is coupled with a wiper arm rod in the area of a first pivoting axis. In turn, the side of the wiper arm rod facing away from the wiper arm head at least indirectly carries the wiper blade or wiper rubber.

In addition to precisely positioning or aligning the described wiper blade plane relative to the vehicle window, it is also necessary to maintain as constant a distance as possible between the wiper arm rod and vehicle window. The constant distance is desirable for pressing the wiper blade against the vehicle window with an at least nearly constant contact pressure, thereby not just resulting in an optimal wiping result, but also minimizing noise from the wiper blade as it moves along the vehicle window.

DISCLOSURE OF THE INVENTION

The advantage to the wiper arm arrangement according to the invention for cleaning a vehicle window with the features in claim 1 is that an optimized alignment of the wiper blade or wiper blade longitudinal plane relative to the vehicle window is enabled. An optimized alignment is here understood as an alignment of the wiper blade plane perpendicular to the plane of the vehicle window at the respective abutment site as the wiper blade sweeps along the vehicle window. The optimized alignment of the wiper blade or wiper rubber arranged on the wiper blade yields an optimal wiping result on the one hand, and minimizes noise as the wiper blade sweeps along the vehicle window on the other.

To this end, the invention provides that the wiper arm rod consist of two elements, a first element connected with the wiper arm head in the area of the first pivoting axis, and a second element that can be connected at least indirectly with the wiper blade, wherein the two elements are arranged so that they can pivot relative to each other in a second pivoting axis, and wherein the second pivoting axis is or runs at least essentially perpendicular to the first pivoting axis. Such a configuration of the wiper arm rod out of two elements arranged so that they can move relative to each other in a second pivoting axis enables the addressed optimization of the position of the wiper blade while sweeping over the vehicle window, since an additional degree of freedom or additional mobility of the wiper blade can be achieved to take account of a spherically curved vehicle window.

Advantageous further developments of the wiper arm arrangement according to the invention for cleaning a vehicle window are listed in the subclaims. The framework of the invention encompasses all combinations of at least two features disclosed in the claims, specification and/or figures.

Further significant for the optimal wiping result or noise is that the wiper blade abuts against the vehicle window with as constant a contact pressure as possible while sweeping over the vehicle window. To this end, a preferred embodiment of the invention provides that at least a respective one spring element be arranged in the area of the two pivoting axes, wherein the first spring element between the wiper arm head and wiper arm rod is designed to exert a first pressing force on the element of the wiper arm rod facing the wiper arm head toward the vehicle window, and wherein the at least one second spring element arranged between the two elements of the wiper arm rod is designed to exert a second pressing force on the wiper blade acting toward the vehicle window.

In a geometrically preferred embodiment of the wiper arm rod, the latter has a curved exterior shape, wherein the second element facing the wiper blade is straight in design, and aligns with a wiper blade longitudinal direction, and wherein a section of the first element of the wiper arm rod connected with the wiper arm head is essentially arranged perpendicular to the second element.

A further development of the latter geometry of the wiper arm rod provides a section of the first element connected with the second element of the wiper arm rod in the area of the second pivoting axis be aligned with the second element, and that the first element of the wiper arm rod have an area curved by about 90°.

In conjunction with the two aforementioned geometric configurations of the wiper arm rod, another preferred embodiment of the invention further provides that the wiper arm head be curved in design, with a curved area of about 90°, and that a section of the wiper arm head that can be connected with a drive shaft of the wiper arm head is arranged at least essentially parallel to the second element of the wiper arm rod.

In order to achieve as constant a pressing force as possible on the vehicle window despite the pivotable arrangement of the two elements of the wiper arm rod, it is further essential that the distance between the wiper arm rod and vehicle window be as constant as possible, so as to thereby also in particular prevent the first element of the wiper arm rod from contacting the vehicle window. To this end, it is provided that a spacer device be arranged on the first element of the wiper arm rod, which is designed to position the first element of the wiper arm rod a constant distance away from the vehicle window.

In a structurally preferred configuration of this spacer device, the side of the latter lying opposite the wiper arm rod has a rotatably mounted roller element or ball element for abutment against the vehicle window. As the wiper arm rod moves along the vehicle window, the roller element or ball element minimizes the friction between the spacer device and vehicle window, as well as wear.

The invention further also encompasses the use of an inventive wiper arm arrangement as described thus far for cleaning spherically curved vehicle windows, in particular in commercial vehicles.

Additional advantages, features and details of the invention may be gleaned from the following description of preferred exemplary embodiments, as well as based on the drawing.

Figure 2:
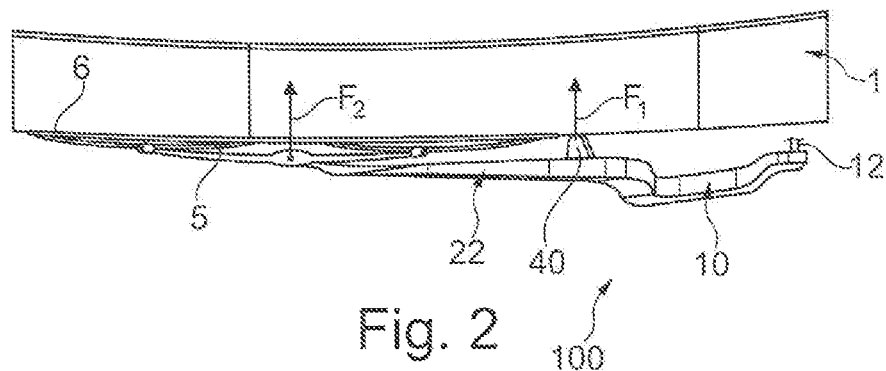
Figure 3:
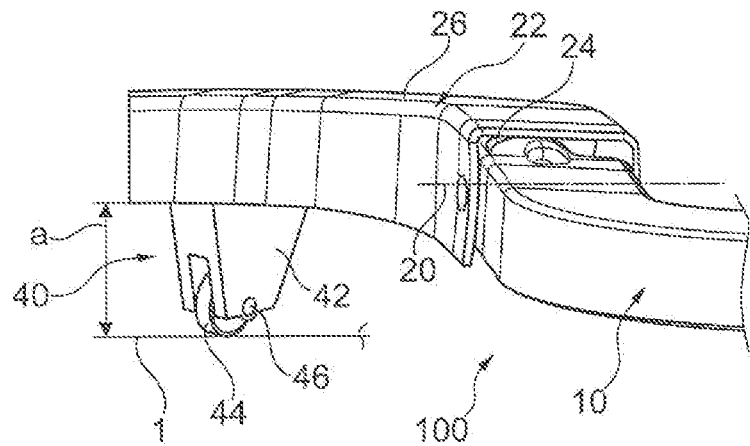

The latter shows:

FIG. 1 a front view of a wiper arm arrangement in the area of a spherically curved vehicle window, FIG. 2 a wiper arm arrangement according to FIG. 1 toward the arrow II on FIG. 1, and FIG. 3 a perspective view of the connecting area between the wiper arm head and wiper arm rod of the wiper arm arrangement with a spacer device connected with the wiper arm rod.

The same elements or elements with the same function are provided with the same reference numbers on the figures.

The wiper arm arrangement 100 shown on the figures is used to clean a spherically curved vehicle window 1, which is also referred to as a wraparound windshield, and used in particular in commercial vehicles like trucks or buses to also reduce the drag of the vehicle.

The wiper arm arrangement 100 has a wiper arm head 10, which in an end area can be pivoted at least indirectly out of the resting position depicted on FIG. 1 in the direction of the arrow 14, for example by 90°, by a wiper motor via a drive shaft 12 (not shown in detail), which is non-rotatably joined with the wiper arm head 10, so as to clean the vehicle window 1.

The wiper arm head 10 has a curved exterior shape, with a first section 16 aligned roughly parallel to a lower edge 2 of the vehicle window 1 in the resting position depicted, and with a second section 18 arranged at least approximately at 900 relative to the first section 16. The wiper arm head 10 is connected with a wiper arm rod 22 in the area of a first pivoting axis on the side of the second section 18 opposite the first section 16.

At least regions of both the wiper arm head 10 and wiper arm rod 22 usually have a U-shaped cross section, in particular in the area of the first pivoting axis 20. At least one spring element 24 is arranged in the resultant receiving space between the wiper arm head 10 and wiper arm rod 22, and exerts a first contact pressure $F_1$ on the wiper arm rod 22 toward the vehicle window 1.

The wiper arm rod 22 consists of two elements 26, 28, which are joined together in the area of a second pivoting axis 30. Essential here is that the second pivoting axis 30 is offset or turned by at least approximately 90° relative to the first pivoting axis 20, wherein the two pivoting axes 20, 30 run at least approximately roughly parallel to the vehicle window 1 or parallel to the plane of the wiper arm head 10 and wiper arm rod 22. In addition, at least one second spring element 32 is provided in the connecting area between the two elements 26, 28 of the wiper arm rod 22, and exerts a second pressing force $F_2$ on the second element 28 of the wiper arm rod 22 toward the vehicle window 1.

While the second element 28 of the wiper arm rod 22 has a straight exterior shape, the first element 26 has a first section 34 that is also straight in design, and aligned with the longitudinal direction of the second element 28. The first section 34 transitions by way of a curved section 36 into a second section 38, which is connected with the wiper arm head 10. An angle of at least approximately 90° is formed between the two sections 34, 38 of the wiper arm rod 22.

A wiper blade 5 with a wiper rubber 6 for abutting against the vehicle window 1 is arranged on the second element 28 of the wiper arm rod 22. A wiper blade longitudinal direction 7 is here aligned flush with the second element 28 of the wiper arm rod 22, and the wiper blade plane 8 that is arranged perpendicular to the drawing plane on FIG. 1 and intersects the wiper blade longitudinal direction 7 runs perpendicular to the vehicle window 1 in the area where the wiper blade 5 abuts against the vehicle window 1.

In order to always enable a constant distance between the wiper arm rod 22 and vehicle window 1 as the wiper blade 5 sweeps along the vehicle window 1, so that in particular the second pressing force $F_2$ always also remains as constant as possible, the wiper arm rod 22 has a spacer device 40 in the area of the first element 26 of the wiper arm rod 22. The spacer arm device 40 visible on FIGS. 2 and 3 encompasses a spacer element 42, which is arranged on the side of the first element 26 facing the vehicle window 1, and serves to fasten or retain a roller element 44 that is rotatably mounted in a rotational axis 46 of the spacer element 42. The distance a between the first element 26 of the wiper arm rod 22 and the vehicle window 1 is thus formed between the running surface or point of contact of the roller element 44 on the vehicle window 1 and the lower side of the first element 26 of the wiper arm rod 22.

The wiper arm arrangement 100 as far as described above can be altered or modified without deviating from the inventive idea.

REFERENCE LIST

1 Vehicle window
2 Lower edge
5 Wiper blade
6 Wiper rubber
7 Wiper blade longitudinal direction
8 Wiper blade plane
10 Wiper arm head
12 Drive shaft
14 Arrow
16 $1^{st}$ section
18 $2^{nd}$ section
20 $1^{st}$ pivoting axis
22 Wiping arm rod
24 $1^{st}$ spring element
26 $1^{st}$ element
28 $2^{nd}$ element
30 $2^{nd}$ pivoting axis
32 $2^{nd}$ spring element
34 $1^{st}$ section
36 Curved section
38 $2^{nd}$ section
40 Spacer device
43 Spacer element
44 Roller element
46 Rotational axis
100 Wiper arm arrangement
$F_1$ $1^{st}$ pressing force
$F_2$ $2^{nd}$ pressing force
a Distance

The invention claimed is:

1. A wiper arm arrangement for cleaning a vehicle window, comprising:
   a wiper arm head at least indirectly connected by a wiper arm rod with an elongated wiper blade at a first end region and with a drive shaft at a second end region lying opposite the first end region,
   wherein the wiper arm rod is pivotably mounted on a side facing the wiper arm head in a first pivoting axis,
   wherein the wiper arm rod consists of two elements, a first element connected with the wiper arm head and a second elongated element connected at least indirectly with the wiper blade, and
   wherein the two elements are arranged so that they can pivot relative to each other in a second pivoting axis, wherein the second pivoting axis is arranged essentially perpendicular to the first pivoting axis, wherein the wiper arm rod is curved, wherein the second element facing the wiper blade is straight along the elongation thereof, and aligned parallel to the wiper blade elongation, and wherein a section of the first element of the wiper arm rod connected with the wiper arm head is arranged perpendicular to the second element.

2. The wiper arm arrangement according to claim 1, wherein at least a respective one spring element is arranged in an area of the two pivoting axes, wherein a first spring element between the wiper arm head and wiper arm rod exerts a first pressing force on the first element of the wiper arm rod facing the wiper arm head toward the vehicle window, and wherein at least one second spring element arranged between the two elements of the wiper arm rod exerts a second pressing force on the wiper blade acting toward the vehicle window.

3. The wiper arm arrangement according to claim 1, wherein a section of the first element connected with the second element in an area of the second pivoting axis is aligned with the second element, and that the first element of the wiper arm rod has an area curved by about 90°.

4. The wiper arm arrangement according to claim 1, wherein the wiper arm head is curved in design, and has two sections arranged at least approximately at about 90° relative to each other, and that one of the sections of the wiper arm head that connected with the drive shaft, and is arranged at least essentially parallel to the second element of the wiper arm rod.

5. The wiper arm arrangement according to claim 1, wherein a spacer device is arranged on the first element of the wiper arm rod, and designed to hold the first element of the wiper arm rod a constant distance away from the vehicle window.

6. The wiper arm arrangement according to claim 5, wherein side of the spacer device facing away from the wiper arm rod has a rotatably mounted roller element or ball element for abutment against the vehicle window.

7. The wiper arm arrangement according to claim 1, wherein the arrangement is configured to clean spherically curved commercial vehicle windows.

* * * * *

UNITED STATES PATENT AND TRADEMARK OFFICE
CERTIFICATE OF CORRECTION

Page 1 of 1

PATENT NO. : 11,091,124 B2
APPLICATION NO. : 16/225834
DATED : August 17, 2021
INVENTOR(S) : Matthias Purz et al.

It is certified that error appears in the above-identified patent and that said Letters Patent is hereby corrected as shown below:

On the Title Page

Under item (65) Prior Publication Data, Line 2, insert:
-- (30) Foreign Application Priority Data
December 21, 2017 (DE) 102017130945.4 --.

Signed and Sealed this
Sixteenth Day of November, 2021

Drew Hirshfeld
*Performing the Functions and Duties of the*
*Under Secretary of Commerce for Intellectual Property and*
*Director of the United States Patent and Trademark Office*